(12) United States Patent
Miao et al.

(10) Patent No.: US 11,332,639 B2
(45) Date of Patent: May 17, 2022

(54) AQUEOUS ANTIFOGGING RESIN, AQUEOUS ANTIFOGGING COATING COMPOSITION AND PREPARATION METHOD THEREOF

(71) Applicant: HUNAN SOKAN NEW MATERIALS CO., LTD., Hunan (CN)

(72) Inventors: Peikai Miao, Hunan (CN); Yunjian Ling, Hunan (CN); Weiguo Wang, Hunan (CN); Bo Yang, Hunan (CN); Guoqiang Lv, Hunan (CN)

(73) Assignee: HUNAN SOKAN NEW MATERIALS CO., LTD., Hunan (CN)

( * ) Notice: Subject to any disclaimer, the term of this patent is extended or adjusted under 35 U.S.C. 154(b) by 250 days.

(21) Appl. No.: 16/614,608

(22) PCT Filed: Jan. 23, 2019

(86) PCT No.: PCT/CN2019/072789
§ 371 (c)(1),
(2) Date: Nov. 18, 2019

(87) PCT Pub. No.: WO2020/133616
PCT Pub. Date: Jul. 2, 2020

(65) Prior Publication Data
US 2021/0071031 A1  Mar. 11, 2021

(30) Foreign Application Priority Data
Dec. 25, 2018  (CN) .......................... 201811586921.5

(51) Int. Cl.
| | | |
|---|---|---|
| *C09D 175/14* | (2006.01) | |
| *C09D 7/65* | (2018.01) | |
| *C09D 7/45* | (2018.01) | |
| *C08G 18/10* | (2006.01) | |
| *C08G 18/34* | (2006.01) | |
| *C08G 18/62* | (2006.01) | |
| *C08G 18/76* | (2006.01) | |
| *C09D 5/00* | (2006.01) | |
| *C09D 133/14* | (2006.01) | |
| *C09D 133/26* | (2006.01) | |
| *C08F 220/20* | (2006.01) | |
| *C08F 220/06* | (2006.01) | |
| *C08G 18/67* | (2006.01) | |
| *C08G 18/75* | (2006.01) | |
| *C08G 18/73* | (2006.01) | |
| *C08G 18/16* | (2006.01) | |
| *C08G 18/24* | (2006.01) | |
| *C08G 18/08* | (2006.01) | |
| *C08F 8/30* | (2006.01) | |

(Continued)

(52) U.S. Cl.
CPC .............. *C09D 175/14* (2013.01); *C08F 8/30* (2013.01); *C08F 220/06* (2013.01); *C08F 220/20* (2013.01); *C08G 18/0823* (2013.01); *C08G 18/10* (2013.01); *C08G 18/168* (2013.01); *C08G 18/246* (2013.01); *C08G 18/3281* (2013.01); *C08G 18/348* (2013.01); *C08G 18/6229* (2013.01); *C08G 18/672* (2013.01); *C08G 18/73* (2013.01); *C08G 18/755* (2013.01); *C08G 18/7614* (2013.01); *C08G 18/7621* (2013.01); *C08G 18/7671* (2013.01); *C09D 5/00* (2013.01); *C09D 5/1662* (2013.01); *C09D 5/1687* (2013.01); *C09D 7/45* (2018.01); *C09D 7/65* (2018.01); *C09D 133/14* (2013.01); *C09D 133/26* (2013.01); *C09D 175/04* (2013.01); *C08L 2201/50* (2013.01)

(58) Field of Classification Search
CPC ..... C08F 220/20; C08G 18/10; C08G 18/348; C08G 18/6229; C08G 18/7614; C08G 18/7621; C08G 18/672; C08G 18/755; C08G 18/7671; C08G 18/73; C08G 18/168; C08G 18/246; C08G 18/0823; C08G 18/3281; C08L 2201/50; C09D 175/14; C09D 7/65; C09D 7/45; C09D 5/00; C09D 133/14; C09D 133/26; C09D 175/04; C09D 5/1662; C09D 5/1687
See application file for complete search history.

(56) References Cited

FOREIGN PATENT DOCUMENTS

CN    105504144    *    4/2016

OTHER PUBLICATIONS

Machine English translation of CN 105504144, Peikai et al., Apr. 2016.*

* cited by examiner

*Primary Examiner* — Patrick D Niland
(74) *Attorney, Agent, or Firm* — Calfee Halter & Griswold LLP

(57) ABSTRACT

The present invention discloses an aqueous antifogging resin, introducing a molecular segment and a functional group with good hydrophilicity and hygroscopicity, which impart excellent antifogging performance, coating strength and transparent flow appearance to the aqueous antifogging resin and the cured coating has a water contact angle of up to 1~10°. The present invention further discloses a coating composition including the aqueous antifogging resin, and the cured coating of the coating composition has good antifogging, wear-resistant, water-resistant, chemical resistant, stain-resistant and UV-resistant performance, and excellent adhesion to a substrate; and the coating is firm at the same time, and has excellent film-forming strength and flexual endurance. The coating composition can be used for antifogging surface treatment of the window of mobile phone, PC or PMMA transparent materials, automotive glass and bathroom mirrors and has good long-term stability.

12 Claims, No Drawings

(51) Int. Cl.
*C09D 175/04* (2006.01)
*C08G 18/32* (2006.01)
*C09D 5/16* (2006.01)

AQUEOUS ANTIFOGGING RESIN, AQUEOUS ANTIFOGGING COATING COMPOSITION AND PREPARATION METHOD THEREOF

CROSS-REFERENCE TO RELATED APPLICATIONS

This application is a 371 of PCT Application No. PCT/CN2019/072789 filed on Jan. 23, 2019, which claims priority to Chinese Application No. 201811586921.5 filed on Dec. 25, 2018, the contents of which are hereby incorporated by reference as if recited in their entirety.

TECHNICAL FIELD

The invention relates to the technical field of an aqueous coating, in particular to an aqueous antifogging resin and preparation method thereof. Further, the present invention also relates to an aqueous antifogging coating composition comprising the aqueous antifogging resin and preparation method thereof.

PRIOR ART

In daily life, there are obvious temperature differences and humidity differences on both sides of the plastic or glass. In the air at high temperature side, when vaporized liquid encounters materials such as plastic or glass, it will condense on a surface of the materials to form small droplets with poor fluidity, causing fog on the surface of the plastic or glass. These small droplets can cause irregular scattering, reflection and diffraction of light, which affects the ability of transparent materials such as plastic or glass to transmit light and becomes blurred.

In order to reduce the occurrence of the above phenomenon, there are various methods for improving the antifogging of surfaces of plastic or glass in the prior art. For example, there are the methods of (1) direct penetration of surfactant; (2) direct coating of surfactant; (3) coating of polymer materials. An antifogging coating formed by the method of (1) or (2) has poor stability, the antifogging effect of the antifogging coating is difficult to be durable, and the active agent treatment on the surface of the plastic or glass is often repeated many times. An antifogging coating formed by the method of (3) has good antifogging, wear-resistant, and the durable antifogging performance. However, various organic solvents are needed to be added in the preparation process of the existing polymer coating, which is a lack of environmental friendliness and is not an aqueous coating.

SUMMARY OF THE INVENTION

In the present invention, there is provided an aqueous antifogging resin, preparation method thereof and an antifogging coating composition having the aqueous antifogging resin, so as to overcome the technical problems that an organic solvent is needed to be added in the preparation process of an existing polymer coating and the existing polymer coating is not an aqueous paint.

According to an aspect of the invention, there is provided an aqueous antifogging resin having the following structural formula:

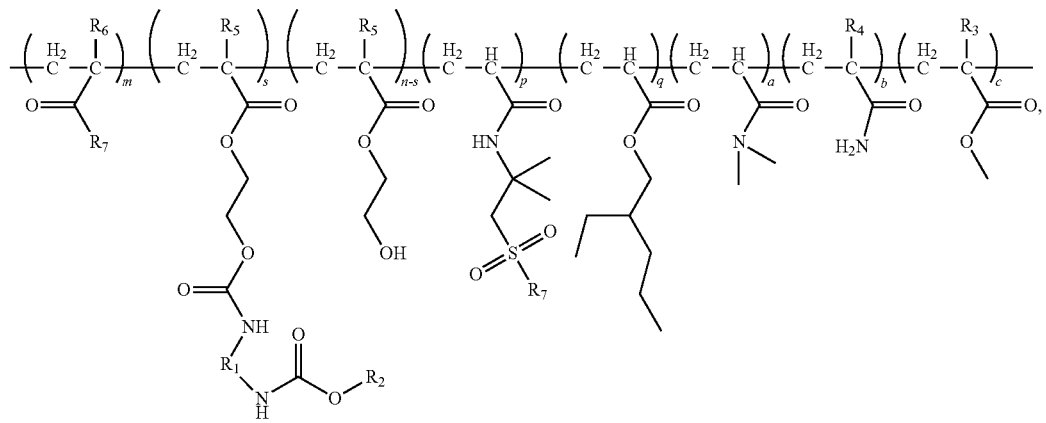

wherein m, s, n, p, q, a, b and c represent the degree of polymerization of each monomer respectively, the degree of polymerization of each monomer is limited to a number-average molecular weight of the aqueous antifogging resin from 5,000 to 100,000, and all of m, s, n, p, q, a, b, and c are positive integers;

a diisocyanate compound is formed by a $R_1$ and an isocyanate group and the $R_1$ is a parent structure of the diisocyanate compound;

$R_2$ is a compound including both a hydroxyl group (OH) and a carboxyl group (COOH);

each of $R_3$, $R_4$, $R_5$, and $R_6$ is selected from one of H and $CH_3$; and $R_7$ is one of $-O^-N^+H(C_2H_5OH)_3$, $-O^-N^+H(C_2H_5)_3$, $-O^-K^+$ and $-O^-Na^+$.

Additionally, the diisocyanate compound is one of tolylene diisocyanate, diphenylmethane diisocyanate, hexamethylene diisocyanate, isophorone diisocyanate and dicyclohexylmethane diisocyanate.

Additionally, the $R_2$ is a lactic acid or a dimethylolpropionic acid.

Additionally, the $R_1$ is the parent structure of the isophorone diisocyanate, the $R_2$ is the dimethylolpropionic acid, $R_3$, $R_4$, $R_5$, and $R_6$ are $CH_3$, $R_5$ is H, and $R_7$ is the $-O^-N^+H(C_2H_5OH)_3$.

Additionally, the number-average molecular weight of the aqueous antifogging resin is from 50,000 to 100,000.

According to another aspect of the invention, there is also provided a preparation method of the aqueous antifogging resin, the preparation method includes steps of:

(1) using dibutyltin dilaurate or p-toluenesulfonic acid as a catalyst, a $R_2$ compound with a hydroxyl group and a carboxyl group, and a diisocyanate compound with $R_1$ being reacted at 40~60° C. for 0.5~2 hours to obtain a first compound, (2) 2-ethylhexyl acrylate, methacrylamide or acrylamide, methyl methacrylate or methyl acrylate, acrylic acid or methacrylic acid, 2-acrylamide-2-methylpro panesulfonic acid, N, N-dimethyl acrylamide, hydroxyethyl methacrylate or hydroxyethyl acrylate, azodiisobutyronitrile being reacted at 60~90° C. for 4~8 hours under the protection of nitrogen to obtain a second compound, (3) a mixture of the first compound and the second compound being reacted at 60~90° C. for 0.5~4 hours, then a basic compound being added into the mixture to further react at 60~90° C. for 0.1~0.5 hours, the basic compound, a partial sulfonic acid group and the carboxyl group being reacted to form a salt to obtain the aqueous antifogging resin, and the basic compound being triethanolamine, triethylamine, potassium hydroxide or sodium hydroxide.

Additionally, the diisocyanate compound is tolylene diisocyanate, diphenylmethane diisocyanate, hexamethylene diisocyanate, isophorone diisocyanate, or dicyclohexylmethane diisocyanate, and the $R_2$ compound with the hydroxyl group and the carboxyl group is lactic acid or dimethylolpropionic acid.

Additionally, in the step (1), the molar ratio of between the $R_2$ compound with the hydroxyl group and the carboxyl group, and the diisocyanate compound with $R_1$ is 1:2~2.5, and the mass of the catalyst is 0.2~1% of the total mass of $R_2$ compound with the hydroxyl group and the carboxyl group, and the diisocyanate compound with $R_1$.

Additionally, in the step (2), the molar ratio of the 2-ethylhexyl acrylate, the methacrylamide or the acrylamide, the methyl methacrylate or the methyl acrylate, the acrylic acid or the methacrylic acid, the 2-acrylamide-2-methylpro panesulfonic acid, the N, N-dimethyl acrylamide, the hydroxyethyl methacrylate or the hydroxyethyl acrylate is 1:0.1~0.4:0.8~1:0.1~0.4:0.4~0.8:0.1~0.4:0.6~1.2, and the amount of the azobisisobutyronitrile is 0.1~0.5% of the total mass of the remaining reaction raw materials.

Additionally, in the step (3), the molar ratio of the second compound to the first compound is 1:0.2~0.8 and the molar ratio of the basic compound to the second compound is 1:0.5~1.2.

According to an aspect of the invention, there is also provided an aqueous antifogging coating composition comprising:
30~60 parts of the aqueous antifogging resin or an aqueous antifogging resin prepared by the preparation method, 5~20 parts of a crosslinking agent, 5~10 parts of a surfactant, 0.1~1 part of a flow agent, and 20~60 parts of a diluent, and each of the above contents being part by weight.

Additionally, the crosslinking agent is an aqueous polycarbodiimide; the flow agent is a polyether-modified silicone with an acrylic functional group; and the diluent is deionized water or distilled water.

According to another aspect of the invention, there is also provided a preparation method of the aqueous antifogging coating composition, including the step of mixing the aqueous antifogging resin, the crosslinking agent, the surfactant, the flow agent, and the diluent uniformly according to the above parts by weight, thereby obtaining the aqueous antifogging coating composition. A heat curing method is adopted in the preparation method of the aqueous antifogging coating composition, wherein the baking temperature is 60-120 and the baking time is 5-30 minutes.

The invention has the following advantage effects:

The aqueous antifogging resin of the present application introduces a molecular segment and a functional group with good hydrophilicity and hygroscopicity: the N, N-dimethyl acrylamide having an excellent hygroscopicity and an antistatic property, hydroxyethyl methacrylate or hydroxyethyl acrylate providing a hydrophilic hydroxyl functional group, methacrylic acid or acrylic acid and lactic acid or dimethylolpropionic acid providing a hydrophilic carboxyl functional group, 2-acrylamide-2-methylpro panesulfonic acid providing a hydrophilicity, methacrylamide or acrylamide having a high water absorption property, methyl methacrylate or methyl acrylate providing a rigidity, and iso-octyl acrylate providing a flexibility. Therefore, due to the presence of a large number of hydrophilic, water-absorbing functional groups, these impart excellent antifogging performance, coating strength and transparent flow appearance to the aqueous antifogging resin and the cured coating has a water contact angle of up to 1~10°. The aqueous antifogging resin of the invention includes a carboxyl group COOH, which can chemically crosslink with polycarbodiimide to enhance the strength and performance of the cured coating film, and the polycarbodiimide has the function of helping to improve the adhesion stability of the coated material. The present invention further discloses a coating composition including the aqueous antifogging resin, and the cured coating of the coating composition has good antifogging, wear-resistant, water-resistant, chemical resistant, stain-resistant and UV-resistant performance, and excellent adhesion to a substrate; and the coating is firm at the same time, and has excellent film-forming strength and flexual endurance. The coating composition can be used for antifogging surface treatment of the window of mobile phone, PC or PMMA transparent materials, automotive glass and bathroom mirrors and has good long-term stability.

In addition to the objects, features and advantages described above, the present invention has other objects, features and advantages. In the following, the invention is described in greater detail with reference to the accompanying drawings.

DETAILED DESCRIPTION OF THE INVENTION

In the following, the embodiments of the present invention are described in detail, but the present invention can be embodied in many different ways as defined and covered below.

According to an aspect of the invention, there is provided an aqueous antifogging resin having the following structural formula:

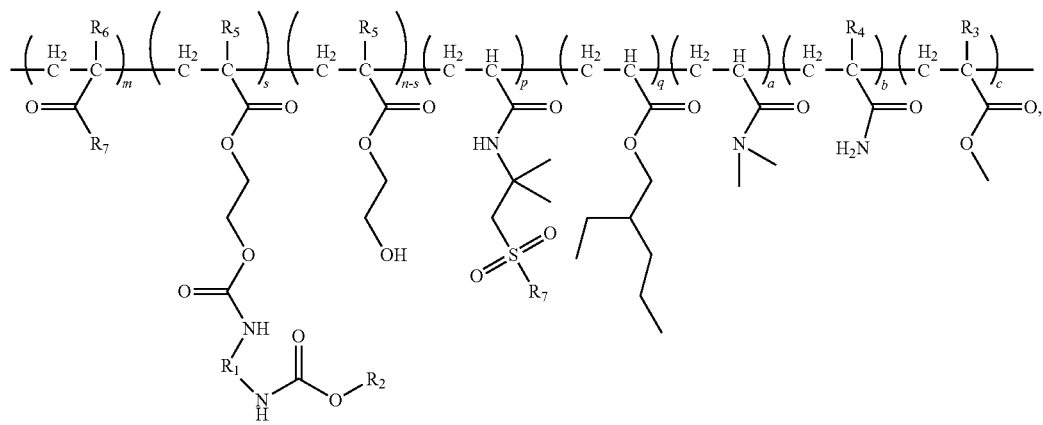

wherein m, s, n, p, q, a, b and c represent the degree of polymerization of each monomer respectively, the degree of polymerization of each monomer is limited to a number-average molecular weight of the aqueous antifogging resin from 5,000 to 100,000, and all of m, s, n, p, q, a, b, and c are positive integers.

A diisocyanate compound is formed by a $R_1$ and an isocyanate group, the $R_1$ is a parent structure of the diisocyanate compound, and the diisocyanate compound is one of tolylene diisocyanate, diphenylmethane diisocyanate, hexamethylene diisocyanate, isophorone diisocyanate and dicyclohexylmethane diisocyanate.

A $R_2$ is a compound including both a hydroxyl group (OH) and a carboxyl group (COOH); each of $R_3$, $R_4$, $R_5$, and $R_6$ is selected from one of H and $CH_3$; and $R_7$ is one of $-O^-N^+H(C_2H_5OH)_3$, $-O^-N^+H(C_2H_5)_3$, $-O^-K^+$ and $-O^-Na^+$.

The aqueous antifogging resin is made of polymerization of multiple compound monomers. The R1 is a parent structure of the diisocyanate compound, i.e. a structural unit of a diisocyanate compound, and an isocyanate group forms a diisocyanate compound on the parent structure represented by R1. Specifically, in the aqueous antifogging resin, both isocyanate groups of the diisocyanate compound participate in a reaction to form a structure of

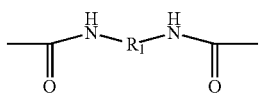

as shown in the structural formula of the aqueous antifogging resin. Some substances of the diisocyanate compound contain a plurality of isomers, and the $R_1$ is a parent structure corresponding to the relevant structure. The $R_1$ being as the parent structure of toluene diisocyanate will be described as an example. The toluene diisocyanate includes two isomers of

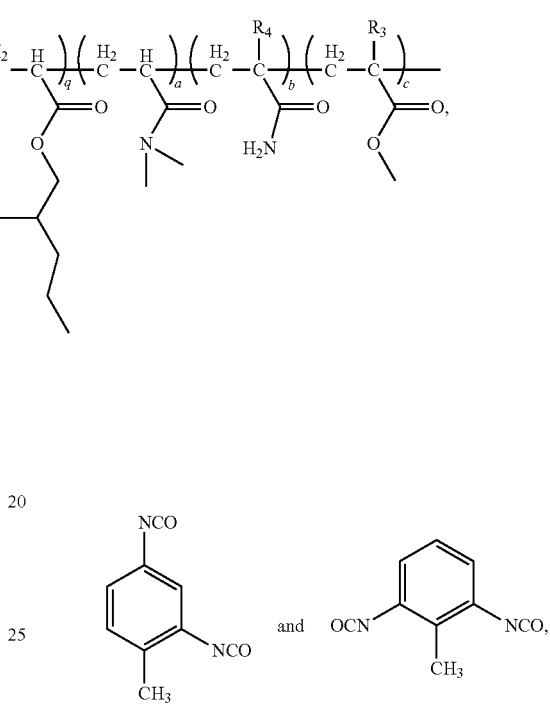

and the corresponding $R_1$ is

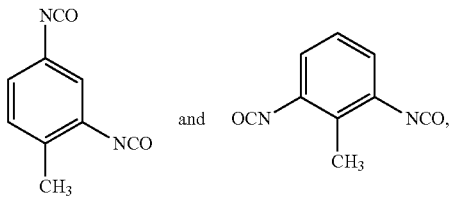

The $R_2$ is a structural unit of a compound with hydroxyl groups, and the compound with hydroxyl groups includes a lactic acid or a dimethylolpropionic acid. The $R_2$ group is obtained by removing H from the terminal hydroxyl of the compound with hydroxyl groups.

The aqueous antifogging resin of the present application introduces a molecular segment and a functional group with good hydrophilicity and hygroscopicity: the N, N-dimethyl acrylamide having an excellent hygroscopicity and an antistatic property, hydroxyethyl methacrylate or hydroxyethyl acrylate providing a hydrophilic hydroxyl functional group, methacrylic acid or acrylic acid and lactic acid or dimethylolpropionic acid providing a hydrophilic carboxyl functional group, 2-acrylamide-2-methylpro panesulfonic acid providing a hydrophilicity, methacrylamide or acrylamide having a high water absorption property, methyl methacrylate or methyl acrylate providing a rigidity, and iso-octyl acrylate providing a flexibility. Therefore, due to the presence of a large number of hydrophilic, water-absorbing functional groups, these impart excellent antifogging performance and coating strength to the aqueous antifogging resin and the cured coating has a water contact angle of up to 1~10°. Further, a part of the sulfonic acid group and the carboxylic acid group are neutralized by a basic compound to form a salt, which achieve the aqueous modification of the aqueous antifogging resin, and the aqueous antifogging resin can be dissolved/dispersed in distilled water or deionized water.

Furthermore, the $R_1$ is the parent structure of the isophorone diisocyanate, the $R_2$ is the dimethylolpropionic acid, $R_3$, $R_4$, $R_5$, and $R_6$ are $CH_3$, $R_5$ is H, and $R_7$ is the $—O^-N^+H(C_2H_5OH)_3$. The aqueous antifogging resin of the structure has the effects of a small water contact angle, a better antifogging property, and a superior performance.

Furthermore, the number-average molecular weight of the aqueous antifogging resin is from 50,000 to 100,000. The number-average molecular weight of the aqueous antifogging resin is easy to form a film, and the antifogging effect is further improved.

According to another aspect of the invention, there is also provided a preparation method of the aqueous antifogging resin, the preparation method includes steps of:

(1) using dibutyltin dilaurate or p-toluenesulfonic acid as a catalyst, a R2 compound with a hydroxyl group and a carboxyl group, and a diisocyanate compound with R1 being reacted at 40~60° C. for 0.5~2 hours to obtain a first compound, (2) 2-ethylhexyl acrylate, methacrylamide or acrylamide, methyl methacrylate or methyl acrylate, acrylic acid or methacrylic acid, 2-acrylamide-2-methylpro panesulfonic acid, N, N-dimethyl acrylamide, hydroxyethyl methacrylate or hydroxyethyl acrylate, azodiisobutyronitrile being reacted at 60~90° C. for 4~8 hours under the protection of nitrogen to obtain a second compound, (3) a mixture of the first compound and the second compound being reacted at 60~90° C. for 0.5~4 hours, then a basic compound being added into the mixture to further react at 60~90° C. for 0.1~0.5 hours, the basic compound, a partial sulfonic acid group and the carboxyl group being reacted to form a salt to obtain the aqueous antifogging resin, and the basic compound being triethanolamine, triethylamine, potassium hydroxide or sodium hydroxide.

In step (1), using dibutyltin dilaurate or p-toluenesulfonic acid as the catalyst, the R2 compound with the hydroxyl group and the carboxyl group, and a monomer including the diisocyanate compound with R1 being reacted at 40~60° C. for 0.5~2 hours to obtain the first compound. The reaction formula of the step (1) is as follows:

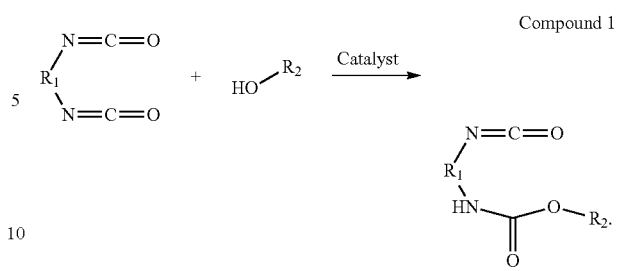

Compound 1

In the step (1), the diisocyanate compound is tolylene diisocyanate, diphenylmethane diisocyanate, hexamethylene diisocyanate, isophorone diisocyanate, or dicyclohexylmethane diisocyanate, and the R2 compound with the hydroxyl group is lactic acid or dimethylolpropionic acid, but it is not limited to thereto. The aqueous antifogging resin finally synthesized in the invention includes a carboxyl group COOH, which can chemically crosslink with polycarbodiimide to enhance the strength and performance of the cured coating film, and the polycarbodiimide has the function of helping to improve the adhesion stability of the coated material.

In the step (2), 2-ethylhexyl acrylate monomer, methacrylamide or acrylamide, methyl methacrylate or methyl acrylate, acrylic acid or methacrylic acid, 2-acrylamide-2-methylpro panesulfonic acid, N, N-dimethyl acrylamide, hydroxyethyl methacrylate or hydroxyethyl acrylate, azodiisobutyronitrile may be added into a 4-mouth flask in sequence, the air in the reaction flask is removed by nitrogen replacement, the temperature is raised to 60-90° C. under nitrogen protection, and the mixture was refluxed and reacted for 4-8 hours to obtain the second compound. An "or" in methacrylamide or acrylamide, methyl methacrylate or methyl acrylate, acrylic acid or methacrylic acid, hydroxyethyl methacrylate or hydroxyethyl acrylate indicates alternative. The reaction formula of the step (2) is as follows:

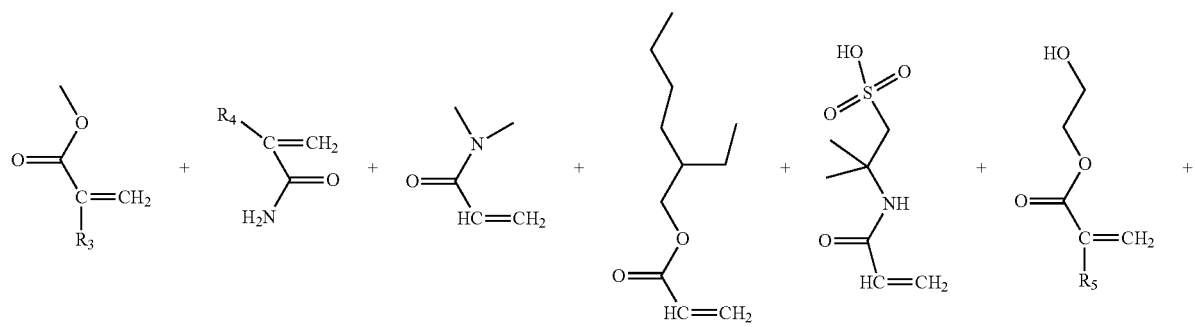

Compound 2

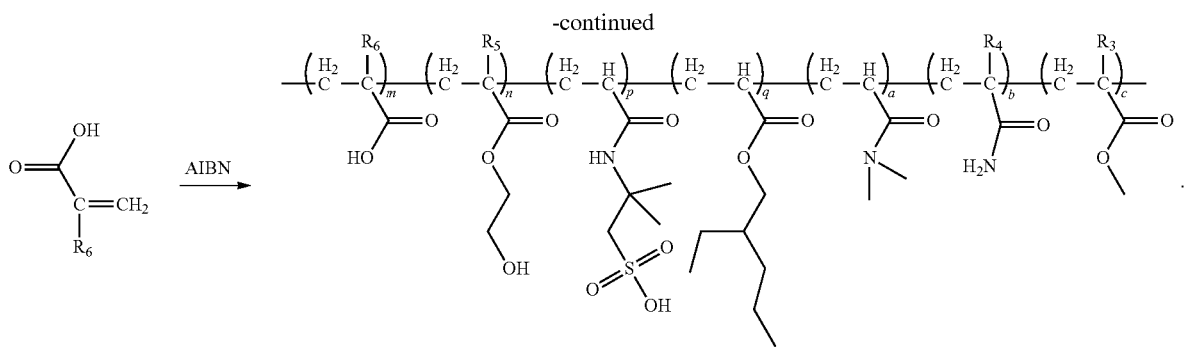

In the step (3), a mixture of the first compound and the second compound are reacted at 60~90° C. for 0.5~4 hours, then a basic compound is added into the mixture to further react at 60~90° C. for 0.1~0.5 hours and finally the aqueous antifogging resin is obtained. Wherein, the degree of polymerization of hydroxyethyl methacrylate or hydroxyethyl acrylate is s+(n-s), and in order to facilitate understanding of the reaction, it is divided into two parts, that is, the structure of the polymer as s has been reacted with the first compound, and the structure of the unreacted polymer as n-s will be described. The reaction formula of the step (2) is as follows:

methylpro panesulfonic acid, the N, N-dimethyl acrylamide, the hydroxyethyl methacrylate or the hydroxyethyl acrylate is 1:0.1~0.4:0.8~1:0.1~0.4:0.4~0.8:0.1~0.4:0.6~4.2. If the molar ratio is not in the range, the content of the isocyanate group in the first compound is too low or too high, and if the content is too low, the reaction between the first compound and the hydroxyl group in the second compound is insufficient such that the molecular weight of the aqueous antifogging resin is too low. If the content is too high, the isocyanate group in the aqueous antifogging resin tends to remain excessive, which affects the storage stability of the

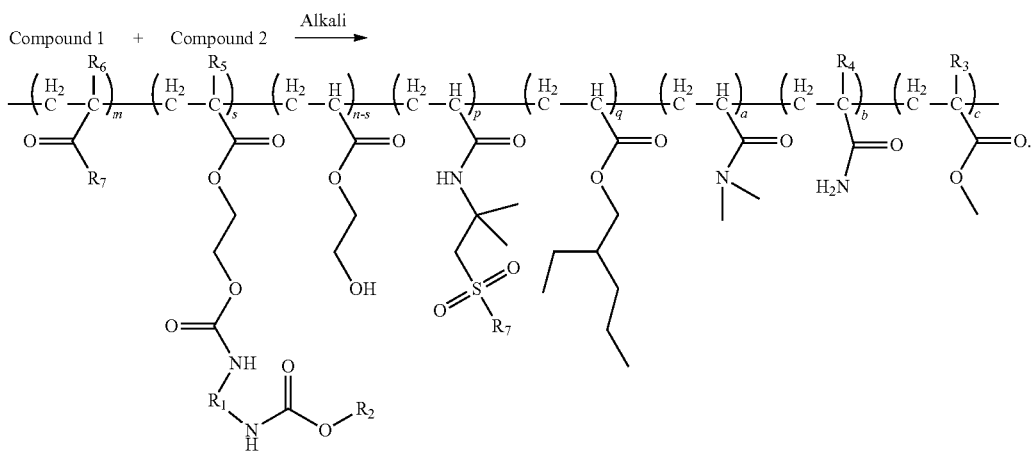

In the above steps, if the temperature and time of reaction are lower than a set value, the degree of reaction in each step is lower, and the degree of polymerization of the corresponding product is lower, resulting in a lower molecular weight of the synthesized aqueous antifogging resin, difficulty in film formation of the resin, and poor antifogging effect. If the temperature and time of the reaction are higher than the set value, energy and time are consumed, and the aqueous antifogging resin has a risk of implosion gelation.

Furthermore, in the step (1), the molar ratio of between the $R_2$ compound with the hydroxyl group and the carboxyl group, and the diisocyanate compound with R1 is 1:2~2.5, and the mass of the catalyst is 0.2~1% of the total mass of $R_2$ compound with the hydroxyl group and the carboxyl group, and the diisocyanate compound with $R_1$.

Furthermore, in the step (2), the molar ratio of the 2-ethylhexyl acrylate, the methacrylamide or the acrylamide, the methyl methacrylate or the methyl acrylate, the acrylic acid or the methacrylic acid, the 2-acrylamide-2- resin and makes the resin easy gelatinization. The amount of the azobisisobutyronitrile is 0.1~0.5% of the total mass of the remaining reaction raw materials. That is, the amount of the azobisisobutyronitrile is 0.1~0.5% of the total mass of the 2-ethylhexyl acrylate, the methacrylamide or the acrylamide, the methyl methacrylate or the methyl acrylate, the acrylic acid or the methacrylic acid, the 2-acrylamide-2-methylpro panesulfonic acid, the N, N-dimethyl acrylamide, the hydroxyethyl methacrylate or the hydroxyethyl acrylate.

Furthermore, in the step (3), the molar ratio of the second compound to the first compound is 1:0.2~0.8 and the molar ratio of the basic compound to the second compound is 1:0.5~4.2. If the molar ratios are not within the range, it is difficult to control the molecular weight of the aqueous antifogging resin within the set range value, causing that the film formability and antifogging effect of the resin are deteriorated.

Furthermore, in the step (1), the $R_2$ compound with a hydroxyl group and a carboxyl group, and a diisocyanate compound with $R_1$ reacts at 60° C. for 2 hours. Under this condition, the reaction conditions are mild and the reaction yield is higher.

Furthermore, in the step (2), the reaction temperature is 90° C. and the reaction time is 8 hours. Under this condition, the reaction conditions are mild and the reaction yield is higher.

Furthermore, in the step (3), a mixture of the first compound and the second compound reacts at 90° C. for 4 hours, then a basic compound is added into the mixture to further react at 90° C. for 0.5 hour. The molar ratio of triethanolamine added and the second compound is 1:1.2. Under this condition, the reaction conditions are mild and the reaction yield is higher.

According to another aspect of the invention, there is also provided an aqueous antifogging coating composition comprising: 30~60 parts of the aqueous antifogging resin or an aqueous antifogging resin prepared by the preparation method, 5~20 parts of a crosslinking agent, 5~10 parts of a surfactant, 0.1~1 part of a flow agent, and 20~60 parts of a diluent, and each of the above contents is part by weight.

Furthermore, the crosslinking agent is an aqueous polycarbodiimide (eg, aqueous polycarbodiimide UN-557 from Shanghai Youen Chemical Co., Ltd.), which can chemically crosslink with the carboxylic acid structural unit (COOH) in the aqueous antifogging resin, to enhance the wear-resistant, water-resistant, chemical resistant, stain-resistant and UV-resistant performance of the coating. The coating is excellent adhesion to a substrate, is firm at the same time, and has excellent film-forming strength and flexural endurance.

The surfactant is at least one of aqueous slauryl sodium sulfate and sodium dioctyl sulfosuccinate.

The flow agent is a polyether modified polysiloxane containing an acrylic functional group (for example, BYK475 of BYK Company, Germany) to promote mirror flow of the film, and the solvent is deionized water or distilled water to adjust the application viscosity.

A preparation method of the coating composition includes the steps of: mixing the aqueous antifogging resin, the crosslinking agent, the surfactant, the flow agent, and the diluent uniformly in accordance with the above part by weight, to obtain the aqueous antifogging coating composition. A heat curing method is adopted in the preparation process of the aqueous antifogging coating composition, wherein the baking temperature is 60-120° C., and the baking time is 5-30 minutes. The synthetic resin of the present invention is a thermosetting resin, and thus a heat curing method is employed.

Preparation Embodiments of the Aqueous Antifogging Coating Composition

The First Embodiment (1) using dibutyltin dilaurate as a catalyst, a dimethylolpropionic acid is reacted with a toluene diisocyanate monomer at 40° C. for 0.5 hour. The molar ratio of the dimethylolpropionic acid and the toluene diisocyanate monomer is 1:2 and the mass of the catalyst is 0.2% of the total mass of the dimethylolpropionic acid and the toluene diisocyanate monomer.

(2) the 2-ethylhexyl acrylate, methacrylamide, methyl methacrylate, methacrylic acid, 2-acrylamide-2-methylpro panesulfonic acid, N, N-dimethyl acrylamide, hydroxyethyl acrylate, azodiisobutyronitrile are added into a 4-mouth flask in sequence, the air in the reaction flask is removed by nitrogen replacement, the temperature is raised to 60° C. under nitrogen protection, and the mixture was refluxed and reacted for 4 hours to obtain the second compound. The molar ratio of the 2-ethylhexyl acrylate, methacrylamide, methyl methacrylate, methacrylic acid, 2-acrylamide-2-methylpro panesulfonic acid, N, N-dimethyl acrylamide, and hydroxyethyl acrylate is 1:0.1: 0.8:0.4:0.4: 0.4:1.2. The amount of azobisisobutyronitrile is 0.1% of the total mass of the above monomers.

(3) A mixture of the first compound and the second compound is reacted at 60° C. for 0.5 hour with a molar ratio of 1:0.2, then a triethanolamine is added into the mixture to further react at 60° C. for 0.1 hour and the molar ratio of the triethanolamine and the second compound is 1:0.5, to obtain a first aqueous antifogging resin with a number-average molecular weight of 5000.

The Second Embodiment (1) using dibutyltin dilaurate as a catalyst, a lactic acid is reacted with a isophorone diisocyanate monomer at 60° C. for 2 hours. The molar ratio of the lactic acid and the isophorone diisocyanate monomer is 1:2.5 and the mass of the catalyst is 0.5% of the total mass of the lactic acid and the isophorone diisocyanate monomer.

(2) the 2-ethylhexyl acrylate, acrylamide, methyl acrylate, methacrylic acid, 2-acrylamide-2-panesulfonic acid, N,N-dimethyl acrylamide, hydroxyethyl methylacrylate, and azodiisobutyronitrile are added into a 4-mouth flask in sequence, the air in the reaction flask is removed by nitrogen replacement, the temperature is raised to 90° C. under nitrogen protection, and the mixture was refluxed and reacted for 8 hours to obtain the second compound. The molar ratio of the 2-ethylhexyl acrylate, acrylamide, methyl acrylate, methacrylic acid, 2-acrylamide-2-panesulfonic acid, N,N-dimethyl acrylamide, and hydroxyethyl methylacrylate is 1:0.4: 1:0.4: 0.8:0.4:1.2. The amount of azobisisobutyronitrile is 0.5% of the total mass of the above monomers.

(3) A mixture of the first compound and the second compound is reacted at 90° C. for 4 hours with a molar ratio of 1:0.8, then a triethanolamine is added into the mixture to further react at 90° C. for 0.5 hour and the molar ratio of the triethanolamine and the second compound is 1:01.2, to obtain a second aqueous antifogging resin with a number-average molecular weight of 100000.

The Third Embodiment (1) using p-toluenesulfonic acid as a catalyst, a dimethylolpropionic acid is reacted with a hexamethylene diisocyanate monomer at 50° C. for 1 hour. The molar ratio of the dimethylolpropionic acid and the hexamethylene diisocyanate monomer is 1:2.2 and the mass of the catalyst is 1% of the total mass of the dimethylolpropionic acid and the hexamethylene diisocyanate monomer.

(2) the 2-ethylhexyl acrylate, methacrylamide, methyl methacrylate, methacrylic acid, 2-acrylamide-2-methylpro panesulfonic acid, N, N-dimethyl acrylamide, hydroxyethyl acrylate, azodiisobutyronitrile are added into a 4-mouth flask in sequence, the air in the reaction flask is removed by nitrogen replacement, the temperature is raised to 70° C. under nitrogen protection, and the mixture was refluxed and reacted for 5 hours to obtain the second compound. The molar ratio of the 2-ethylhexyl acrylate, methacrylamide, methyl methacrylate, methacrylic acid, 2-acrylamide-2-methylpro panesulfonic acid, N, N-dimethyl acrylamide, and hydroxyethyl acrylate is 1:0.2: 0.9:0.2:0.6: 0.3:0.8. The amount of azobisisobutyronitrile is 0.2% of the total mass of the above monomers.

(3) A mixture of the first compound and the second compound is reacted at 80° C. for 1 hour with a molar ratio of 1:0.6, then a triethylamine is added into the mixture to further react at 70° C. for 0.2 hour and the molar ratio of the triethanolamine and the second compound is 1:1, to obtain a third aqueous antifogging resin with a number-average molecular weight of 60000.

The Fourth Embodiment (1) using dibutyltin dilaurate as a catalyst, a dimethylolpropionic acid is reacted with a diphenylmethane diisocyanate monomer at 50° C. for 1.5 hours. The molar ratio of the dimethylolpropionic acid and the diphenylmethane diisocyanate monomer is 1:2.2 and the mass of the catalyst is 0.4% of the total mass of the dimethylolpropionic acid and the diphenylmethane diisocyanate monomer.

(2) the 2-ethylhexyl acrylate, methacrylamide, methyl methacrylate, methacrylic acid, 2-acrylamide-2-methylpro panesulfonic acid, N, N-dimethyl acrylamide, hydroxyethyl acrylate, azodiisobutyronitrile are added into a 4-mouth flask in sequence, the air in the reaction flask is removed by nitrogen replacement, the temperature is raised to 70° C. under nitrogen protection, and the mixture was refluxed and reacted for 6 hours to obtain the second compound. The molar ratio of the 2-ethylhexyl acrylate, methacrylamide, methyl methacrylate, methacrylic acid, 2-acrylamide-2-methylpro panesulfonic acid, N, N-dimethyl acrylamide, and hydroxyethyl acrylate is 1:0.3: 0.9:0.2:0.6: 0.2:0.9. The amount of azobisisobutyronitrile is 0.3% of the total mass of the above monomers.

(3) A mixture of the first compound and the second compound is reacted at 80° C. for 2 hours with a molar ratio of 1:0.6, then a potassium hydroxide is added into the mixture to further react at 60° C. for 0.2 hour and the molar ratio of the triethanolamine and the second compound is 1:0.6, to obtain a fourth aqueous antifogging resin with a number-average molecular weight of 30000.

The First Comparative Embodiment (1) using dibutyltin dilaurate as a catalyst, a dimethylolpropionic acid is reacted with a toluene diisocyanate monomer at 50° C. for 0.3 hour. The molar ratio of the dimethylolpropionic acid and the toluene diisocyanate monomer is 1:1.5 and the mass of the catalyst is 0.1% of the total mass of the dimethylolpropionic acid and the toluene diisocyanate monomer.

(2) the 2-ethylhexyl acrylate, methacrylamide, methyl methacrylate, methacrylic acid, 2-acrylamide-2-methylpro panesulfonic acid, N, N-dimethyl acrylamide, hydroxyethyl acrylate, azodiisobutyronitrile are added into a 4-mouth flask in sequence, the air in the reaction flask is removed by nitrogen replacement, the temperature is raised to 80° C. under nitrogen protection, and the mixture was refluxed and reacted for 4 hours to obtain the second compound. The molar ratio of the 2-ethylhexyl acrylate, methacrylamide, methyl methacrylate, methacrylic acid, 2-acrylamide-2-methylpro panesulfonic acid, N, N-dimethyl acrylamide, and hydroxyethyl acrylate is 1:0.05: 0.2:0.1:0.2: 0.1:0.3. The amount of azobisisobutyronitrile is 0.1% of the total mass of the above monomers.

(3) A mixture of the first compound and the second compound is reacted at 60° C. for 0.5 hour with a molar ratio of 1:0.2, then a triethanolamine is added into the mixture to further react at 60° C. for 0.5 hour and the molar ratio of the triethanolamine and the second compound is 1:0.2, to obtain a fifth aqueous antifogging resin with a number-average molecular weight of 3000.

The Second Comparative Embodiment (1) using dibutyltin dilaurate as a catalyst, a dimethylolpropionic acid is reacted with a toluene diisocyanate monomer at 35° C. for 0.5 hour. The molar ratio of the dimethylolpropionic acid and the toluene diisocyanate monomer is 1:2 and the mass of the catalyst is 0.2% of the total mass of the dimethylolpropionic acid and the toluene diisocyanate monomer.

(2) the 2-ethylhexyl acrylate, methacrylamide, methyl methacrylate, methacrylic acid, 2-acrylamide-2-methylpro panesulfonic acid, N, N-dimethyl acrylamide, hydroxyethyl acrylate, azodiisobutyronitrile are added into a 4-mouth flask in sequence, the air in the reaction flask is removed by nitrogen replacement, the temperature is raised to 50° C. under nitrogen protection, and the mixture was refluxed and reacted for 4 hours to obtain the second compound. The molar ratio of the 2-ethylhexyl acrylate, methacrylamide, methyl methacrylate, methacrylic acid, 2-acrylamide-2-methylpro panesulfonic acid, N, N-dimethyl acrylamide, and hydroxyethyl acrylate is 1:0.1: 0.8:0.4:0.4: 0.4:1.2. The amount of azobisisobutyronitrile is 0.1% of the total mass, of the above monomers.

(3) A mixture of the first compound and the second compound is reacted at 50° C. for 0.5 hour with a molar ratio of 1:0.2, then a triethanolamine is added into the mixture to further react at 50° C. for 0.1 hour and the molar ratio of the triethanolamine and the second compound is 1:0.5, to obtain a sixth aqueous antifogging resin with a number-average molecular weight of 2000.

The Embodiment of the Aqueous Antifogging Coating Composition

The contents of the respective components in the following aqueous antifogging coating compositions of embodiments 5~8 and comparative embodiments 1~2 are as shown in table 1; wherein the content of the coating composition is part by weight respectively.

Table 1 the content of each component of the aqueous antifogging coating composition in embodiments 5~8 and comparative embodiments 1~2

| | embodiment 5 | embodiment 6 | embodiment 7 | Embodiment 8 | comparative embodiment1 | comparative embodiment2 |
|---|---|---|---|---|---|---|
| the first aqueous antifogging resin | 30 | — | — | — | — | — |
| the second aqueous antifogging resin | — | 40 | — | — | — | — |
| the third aqueous antifogging resin | — | — | 50 | — | — | — |
| the fourth aqueous antifogging resin | — | — | — | 60 | — | — |
| the fifth aqueous antifogging resin | — | — | — | — | 40 | — |
| the sixth aqueous antifogging resin | — | — | — | — | — | 40 |
| aqueous polycarbonized diamine | 5 | 10 | 15 | 20 | 10 | 10 |
| auryl sodium sulfate | 5 | 10 | 5 | 5 | 5 | — |
| sodium dioctyl sulfosuccinate | — | — | 5 | 5 | — | 5 |
| BYK475 | 0.1 | 1 | 0.3 | 0.6 | 0.3 | 0.3 |
| deionized water | 20 | 35 | 50 | 60 | 35 | 35 |

The coating compositions of the embodiments 5~8 are coated on the surface of a transparent PC material, and an antifogging coating was obtained by using a baking temperature of 70° C. and a baking time of 20 minutes. The coatings obtained after coating the embodiments 5~8 are tested for adhesion, abrasion resistance, hardness, water contact angle and antifogging performance. The method of test is as follows.

The adhesion is tested in accordance with the criterion of GB9286-1998.

The RCA wear test method is a conventional RCA wear test method using a Norman RCA wear tester with a paint film weight of 175 g.

The pencil hardness is tested in accordance with the criterion of GB/T 6739-2006 with a load of 100 g, and the adhesion is tested in accordance with the criterion of GB 9286-1998.

The water contact angle is tested in accordance with the criterion of GB/T 23764-2009.

The antifogging performance is evaluated by the methods of cold fog and hot fog. The cold fog test method is that the glass product containing the cured coating is taken out after it is stored at −15° C. for 30 minutes, and the transparency of the coated product is observed under room temperature conditions of 50% humidity. The hot fog test method is that the coated surface of the product is taken out after it is placed in saturated water vapor at 80° C. for 60 minutes and the transparency of the coated product is observed under room temperature conditions of 50% humidity. The transparency level is represented by 1 to 5 in order, where 5 represents complete transparency and 1 represents turbid opacity.

The coatings obtained by coating embodiments 5~8 and comparative embodiment 1~2 on a transparent PC are shown in Table 2.

Table 2 the test results of the performance of the coatings obtained by coating embodiments 5~8 and comparative embodiment 1~2

| performance | embodiment 5 | embodiment 6 | embodiment 7 | embodiment 8 | comparative embodiment 1 | comparative embodiment 2 |
|---|---|---|---|---|---|---|
| Adhesion to PC | 5B | 5B | 5B | 5B | 5B | 5B |
| RCA wear resistance | 400 ✪ | 500 ✪ | 400 ✪ | 400 ✪ | 300 ✪ | 200 ✪ |
| pencil hardness | HB | H | F | HB | 1B | 2B |
| Water contact angle | 10° | 1° | 5° | 7° | 25° | 30° |
| antifogging performance (cold fog) | 4 | 5 | 5 | 4 | 3 | 2 |
| antifogging performance (hot fog) | 4 | 5 | 5 | 4 | 3 | 2 |

As can be seen from table 2, the coating compositions formed by applying the coating compositions of embodiments 5~8 to the transparent PC have good surface properties; and the antifogging property of the coating composition of embodiment 6 is particularly remarkable and has good adhesion, wear resistance and hardness. In the comparative embodiments, since the number-average molecular weight of the prepared aqueous antifogging resin is 3,000 and 2,000 respectively in comparative embodiments 1~2, which are smaller than the values required in the present invention, the antifogging properties of coatings cured by coating compositions are significantly reduced, and the coating's wear resistance and hardness are significantly reduced.

The above descriptions are only the preferred embodiments of the present invention and are not intended to limit the present invention. It will be apparent to those skilled in the art that various modifications and changes can be made. Any modifications, equivalent substitutions, and improvements made within the spirit and principle of the present invention should be included in the scope of the present invention.

The invention claimed is:

1. An aqueous antifogging resin, wherein the aqueous antifogging resin has the following structural formula:

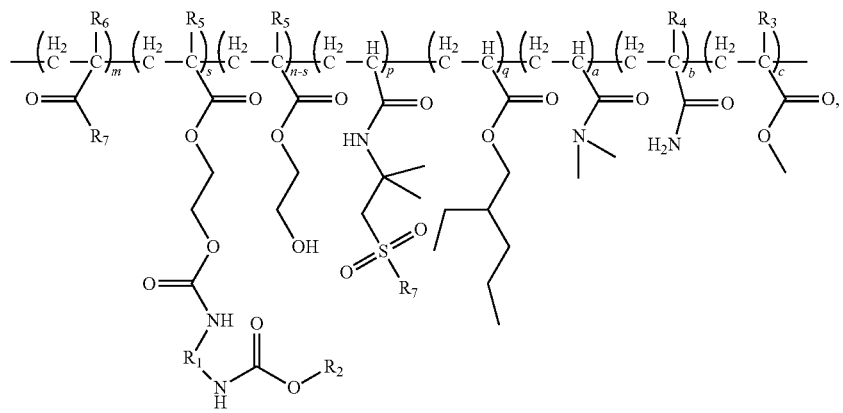

wherein m, s, n, p, q, a, b and c represent a degree of polymerization of each monomer, wherein the degree of polymerization of each monomer is a number-average molecular weight of the aqueous antifogging resin from 5,000 to 100,000, and all of m, s, n, p, q, a, b, and c are positive integers;

wherein a diisocyanate compound is formed by a $R_1$ and an isocyanate group and the $R_1$ is a parent structure of the diisocyanate compound;

wherein $R_2$ is a compound including both a hydroxyl group (OH) and a carboxyl group (COOH);

wherein each of $R_3$, $R_4$, $R_5$, and $R_6$ is selected from one of H and $CH_3$; and wherein $R_7$ is one of $—O^-N^+H(C_2H_5OH)_3$, $—O^-N^+H(C_2H_5)_3$, $—O^-K^+$ and $—O^-Na^+$.

2. The aqueous antifogging resin of claim 1, wherein the diisocyanate compound is one of tolylene diisocyanate, diphenylmethane diisocyanate, hexamethylene diisocyanate, isophorone diisocyanate and dicyclohexylmethane diisocyanate, and the $R_2$ is a lactic acid or a dimethylolpropionic acid.

3. The aqueous antifogging resin of claim 2, wherein the $R_1$ is the parent structure of the isophorone diisocyanate,
the $R_2$ is the dimethylolpropionic acid,
$R_3$, $R_4$, $R_5$, and $R_6$ are $CH_3$,
$R_5$ is H, and
$R_7$ is the $—O^-N^+H(C_2H_5OH)_3$.

4. The aqueous antifogging resin of claim 1, wherein the number-average molecular weight of the aqueous antifogging resin is from 50,000 to 100,000.

5. A method of preparing the aqueous antifogging resin of claim 1, wherein the method includes the steps of:
(1) reacting, using dibutyltin dilaurate or p-toluenesulfonic acid as a catalyst, a $R_2$ compound with a hydroxyl group and a carboxyl group, and a diisocyanate compound with $R_1$ at 40-60° C. for 0.5-2 hours to obtain a first compound,
(2) reacting 2-ethylhexyl acrylate, methacrylamide or acrylamide, methyl methacrylate or methyl acrylate, acrylic acid or methacrylic acid, 2-acrylamide-2-methylpro panesulfonic acid, N, N-dimethyl acrylamide, hydroxyethyl methacrylate or hydroxyethyl acrylate, azodiisobutyronitrile at 60-90° C. for 4-8 hours under the protection of nitrogen to obtain a second compound,
(3) reacting a mixture of the first compound and the second compound at 60-90° C. for 0.5-4 hours, then adding a basic compound into the mixture to further react at 60-90° C. for 0.1-0.5 hours, wherein the basic compound, a partial sulfonic acid group and the carboxyl group react to form a salt to obtain the aqueous antifogging resin, and the basic compound being triethanolamine, triethylamine, potassium hydroxide or sodium hydroxide.

6. The method of claim 5, wherein the diisocyanate compound is tolylene diisocyanate, diphenylmethane diisocyanate, hexamethylene diisocyanate, isophorone diisocyanate, or dicyclohexylmethane diisocyanate, and the $R_2$ compound with the hydroxyl group and the carboxyl group is lactic acid or dimethylolpropionic acid.

7. The method of claim 5, wherein in step (1), a molar ratio of the $R_2$ compound with the hydroxyl group and the carboxyl group, and the diisocyanate compound with $R_1$ is 1:2-2.5, and the mass of the catalyst is 0.2-1% of the total mass of $R_2$ compound with the hydroxyl group and the carboxyl group, and the diisocyanate compound with $R_1$.

8. The method of claim 5, wherein in step (2), a molar ratio of the 2-ethylhexyl acrylate, the methacrylamide or the acrylamide, the methyl methacrylate or the methyl acrylate, the acrylic acid or the methacrylic acid, the 2-acrylamide-2-methylpropanesulfonic acid, the N, N-dimethyl acrylamide, the hydroxyethyl methacrylate or the hydroxyethyl acrylate, the azodiisobutyronitrile is 1:0.1-0.4:0.8-1:0.1-0.4:0.4-0.8:0.1-0.4:0.6-1.2, and the amount of the azobisisobutyronitrile is 0.1-0.5% of the total mass of the remaining reaction raw materials.

9. The method of claim 5, wherein in step (3), a molar ratio of the second compound to the first compound is 1:0.2-0.8 and a molar ratio of the basic compound to the second compound is 1:0.5-1.2.

10. An aqueous antifogging coating composition comprising:
30-60 parts by weight of the aqueous antifogging resin according to claim 1, 5-20 parts by weight of a crosslinking agent, 5-10 parts by weight of a surfactant, 0.1-1 part by weight of a flow agent, and 20-60 parts by weight of a diluent.

11. The aqueous antifogging coating composition of claim 10, wherein the crosslinking agent is an aqueous polycarbodiimide; the flow agent is a polyether-modified silicone with an acrylic functional group; and the diluent is deionized water or distilled water.

12. The aqueous antifogging coating composition according to claim 10, wherein the aqueous antifogging coating composition is obtained by mixing 30-60 parts by weight of the aqueous antifogging resin, 5-20 parts by weight of the crosslinking agent, 5-10 parts by weight of the surfactant, 0.1-1 part by weight of the flow agent, and 20-60 parts by weight of the diluent uniformly.

* * * * *